United States Patent Office 2,903,459
Patented Sept. 8, 1959

2,903,459

1-PYRROLIDINO-4-(1-METHYL PIPERIDYL-2)-BUTANES AND SALTS THEREOF

Jack Mills, Glenns Valley, Ind., assignor to Eli Lilly and Company, Indianapolis, Ind., a corporation of Indiana No Drawing. Application April 12, 1957
Serial No. 652,339

6 Claims. (Cl. 260—293)

This invention relates to mono- and di-quaternary salts of certain novel diaminoalkanes.

The novel compounds of this invention can be represented by the following structural formula

FORMULA I

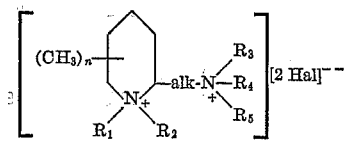

wherein $n$ is one of the cardinal numbers 0, 1, and 2; $R_1$ is hydrogen or methyl; $R_2$ and $R_3$ are either methyl or ethyl; -alk- is a divalent radical such as a trimethylene radical, $-CH_2-CH_2-CH_2-$, a tetramethylene radical, $-CH_2-CH_2-CH_2-CH_2-$, an $\alpha$-methyltetramethylene radical,

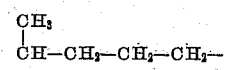

or a $\beta$-methyltetramethylene radical,

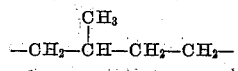

$R_4$ and $R_5$ when taken separately are ethyl radicals, and when taken together, are the polymethylene radicals necessary to complete a pyrrolidine or a piperidine ring; and Hal represents a halogen having an atomic number greater than 16.

As will be seen from the foregoing formula, this invention comprises a group of compounds in which a propane, butane or pentane molecule has attached at the $\alpha$ carbon atom the nitrogen of a quaternary amine and at the carbon atom in the $\gamma$ or $\delta$ position of the alkyl chain, a piperidine ring. The piperidine ring is joined to the alkyl chain through an $\alpha$ carbon atom of that ring. The nitrogen of the piperidine ring is alkylated and the tertiary amine thus formed is present either as an acid addition salt by reaction with a halogen acid, or as a quaternary salt by reaction with a methyl or ethyl halide. In addition, one or more of the unsubstituted positions of the piperidine ring, as well as the carbon atoms of the alkyl chain $\alpha$ and $\beta$ to the piperidine ring, can be substituted with a methyl group. However, not more than two methyl groups can be present in these positions in a given compound.

The other amino group, at the opposite end of the alkyl chain from the piperidine ring, is attached through its nitrogen atom to that chain, as shown in the above formula. The other amino group can be a diethylamino radical, a pyrrolidino radical or a piperidino radical and is present as a quaternary salt by reaction with a methyl or ethyl halide.

Compounds coming within the scope of Formula I which are illustrative of my invention include N-methyl-N-[4-(1-ethylpiperidyl-2)-butyl]-pyrrolidinium iodide hydriodide, N-ethyl-N-[3-(1,6-dimethylpiperidyl-2)-propyl]-triethyl ammonium chloride hydrochloride, and 1-pyrrolidino-4-(1,4,6-trimethylpiperidyl-2)-pentane dimethbromide.

The compounds of this invention are synthesized by one of two routes, each of which employs the same type of starting material. The synthetic route selected depends upon whether the final compound is to be a bis-quaternary di-salt or a quaternary-tertiary di-salt. The two routes and the final product of each are schematically represented below in Equation 1 wherein n, $R_2$, $R_3$, $R_4$, $R_5$, alk and Hal have the same meaning as hereinabove.

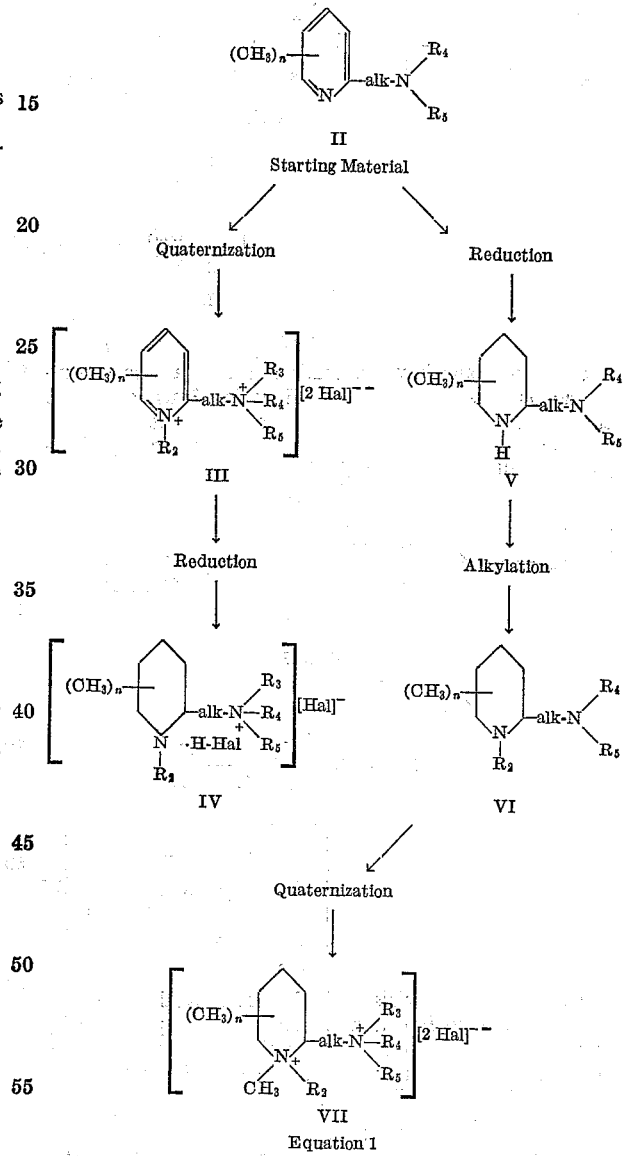

Equation 1

Regardless of whether synthetic route 1 or 2 is followed to a desired final product, the starting material is a pyridyl substituted alkylamine as represented by II. If a mono-tertiary, mono-quaternary di-salt as represented by IV is to be synthesized using route 1, the starting pyridyl-substituted alkylamine (II) is quaternized to a di-quaternary, pyridyl-substituted alkylamine (III) which is then reduced to yield as an end product, a salt of an N-alkylated-piperidyl-substituted, alkyl-substituted quaternary amine (IV). If a di-quaternary compound is to be synthesized via route 2, the starting pyridyl-substituted alkylamine (II) is reduced to a piperidyl-substituted alkylamine (V) which is alkylated on the nitrogen of the piperidine to yield an N-alkyl-piperidyl-substituted alkylamine (VI). This compound is then quaternized to yield, as the end product of the synthetic route, a di-quaternary N-alkylpiperidyl-substituted alkylamine (VII).

The above two synthetic routes are more fully illustrated below, using specific compounds and reactants corresponding to Formulas II, III, IV, V, VI, and VII as set forth above. To illustrate synthetic route 1 which leads to a mono-tertiary, mono-quaternary di-salt (IV), a diamine corresponding to Formula II such as N-[4-(pyridyl-2)-butyl]-pyrrolidine is quaternized and the resulting di-quaternary compound is reduced to yield N-methyl-N-[4-(1-methylpiperidyl-2)-butyl] - pyrrolidinium iodide hydriodide. This sequence of reaction is illustrated in Equation 2.

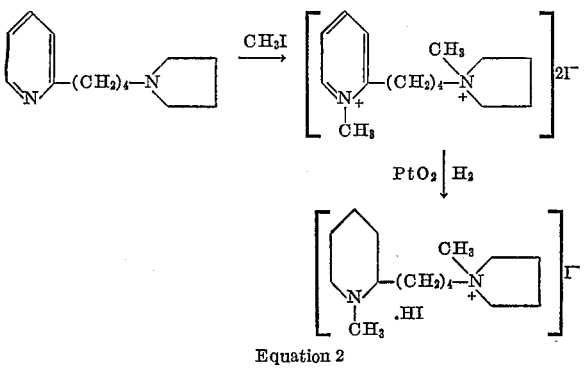

Equation 2

Synthetic route 2, which leads to a di-quaternary compound, is illustrated below in Equation 3 using specific compounds. The same starting material is employed as in Equation 2 but the final product is 1-(methylpiperidyl-2)-4-pyrrolidylbutanedimethyliodide.

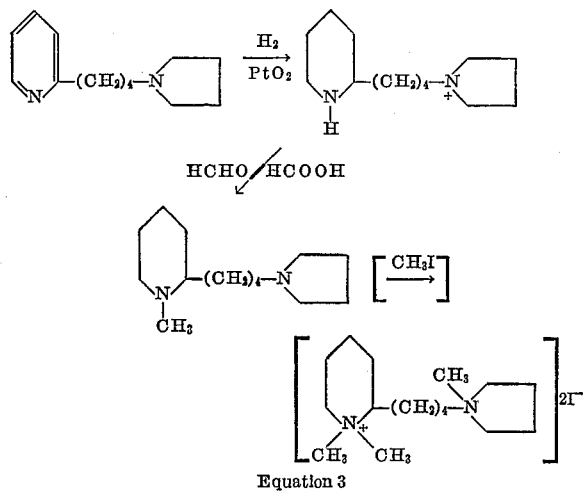

Equation 3

The starting materials utilized in both synthetic routes, corresponding to Formula II above, can be prepared by either of two methods. One method comprises the reaction of a β or γ chloroalkylamine with the sodium salt of a substituted pyridine having at least one α-methyl or methylene substituent. This reaction is illustrated below in Equation 4 using α-picoline and N-(3-chloropropyl)-pyrrolidine as examples of reactants.

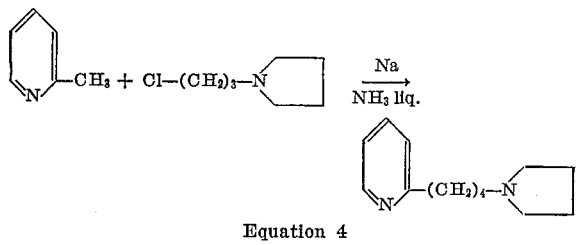

Equation 4

When it is desired to provide a methyl group on one of the carbon atoms of the alkyl chain α or β to the pyridine ring, it can be introduced using the same general method. Thus, a methyl group in the α-position can be introduced by using α-ethylpyridine in place of α-picoline, as illustrated below in Equation 5.

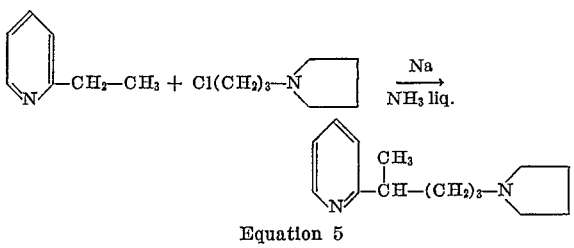

Equation 5

Likewise, a methyl group in the β-position of the alkyl chain (having reference to the pyridine ring) can be introduced by the reaction of a secondary amine such as N-(3-chlorobutyl)-pyrrolidine, with α-picoline, as illustrated in Equation 6.

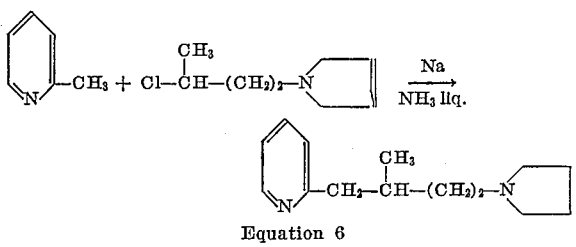

Equation 6

Compounds having methyl groups in the 3-, 4-, 5- and 6-positions of the pyridine ring are obtained by starting with the proper methyl-substituted pyridine. For example, methyl substituents in both the 4- and 6-positions of the pyridine ring in a compound corresponding to Formula II are achieved by employing 2, 4, 6-collidine in Equation 4 in place of α-picoline.

An alternative method for preparing compounds having a structure according to Formula II, is to react, under hydrogenating conditions, the proper secondary amine with an ω-(pyridyl-2)-propyl cyanide or ω-(pyridyl-2)-butyl cyanide. This synthetic method is illustrated below in Equation 7, using pyrrolidine and 4-(pyridyl-2)-butyl cyanide as typical reactants.

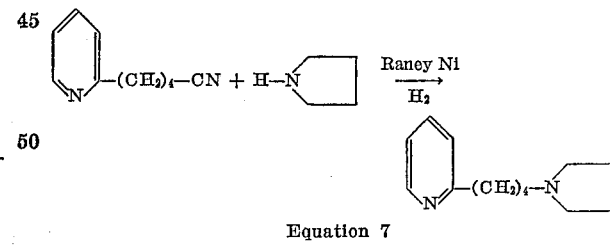

Equation 7

The cyanides which are starting materials for this reaction, are prepared as follows: In the case of the substituted propyl cyanides, hydrogen cyanide is added to an α-vinyl pyridine, using the method of Bockelheide et al., JACS 75, 3245 (1953). In the case of the substituted butyl cyanides, ethyl cyano-acetate is added to an α-vinyl pyridine and this addition product is saponified and decarboxylated.

The compounds provided by this invention corresponding to Formula I above are white crystalline solids. They are quite soluble in water, but are somewhat less soluble in the more polar organic solvents. They are substantially insoluble in most non-polar organic solvents. The compounds tend to crystallize with water or ethanol of crystallization, which can in general be removed by drying in vacuo. Some of the compounds are hygroscopic and even deliquescent, but in most cases a change of the halide ion present in a given compound, for example, a change from chloride to iodide, will tend to mitigate the hygroscopicity.

The group of compounds provided by the invention have useful physiological activity. More specifically, the compounds are selective ganglionic blocking agents. Thus, for example compounds included within the scope of this invention have utility in decreasing gastric secretion and in reducing blood pressure. Hence, they are useful in the treatment of hypertension and in anti-ulcer therapy.

The compounds exert their useful physiological effect when administered orally or parenterally. Oral administration is most convenient, and for this purpose the selected compound can be mixed with a solid pharmaceutical extneding medium and placed in empty capsules for therapeutic administration. Alternatively, a binder can be added to the mixture and tablets prepared therefrom in the usual way. When it is necessary to administer a hygroscopic salt of a compound provided by this invention, capsules are preferred. However, appropriately coated tablets can be used even for administration of the hygroscopic salts. Additionally the compounds of this invention can be mixed with liquid pharmaceutical extending media and can be administered orally or parenterally, for example, as solutions or dispersions in water. The dose range for the above compounds varies from 10 mg. once a day to 20 or more mg. six to eight times a day, depending on the weight of the individual receiving treatment, on the activity of the compound, on the particular condition being treated, and on its severity.

This invention is further illustrated by the following specific examples.

EXAMPLE 1

*Preparation of N-methyl-N-[4-(1,3-dimethylpiperidyl-2)-butyl]-pyrrolidinium iodide hydriodide*

A. CONDENSATION 107 g. of 2,3-lutidine were added dropwise to 20 g. of freshly prepared sodamide in 1 l. of liquid ammonia. After the addition had been completed, 72 g. of N-(3-chloropropyl)-pyrrolidine were added dropwise with stirring to the reaction mixture, thus forming N-[4-(3-picolyl-2)-butyl]-pyrolidine. Sufficient liquid ammonia was added to bring the volume of the reaction mixture up to 1 l. and stirring was continued for sixteen hours. 800 ml. of diethyl ether were then added, whereupon any remaining liquid ammonia vaporized and the organic materials dissolved in the ether. The ether layer was washed with 200 ml. of a saturated solution of sodium chloride, and the organic phase containing the N-[4-(3-picolyl-2)-butyl]-pyrrolidine was separated and was dried. The solvent was removed by evaporation in vacuo and the residue remaining in the flask, comprising N-[4-(3-picolyl-2)-butyl]-pyrrolidine, was distilled at a pressure of about 0.5 mm. of mercury. The fraction boiling in the range of about 115–120° C. at the above pressure was collected, and consisted of N-[4-(3-picolyl-2)-butyl]-pyrrolidine.

*Analysis.*—Calculated: N, 12.83. Found: N, 12.95. $n_D^{25} = 1.516$.

B. QUATERNIZATION 10 g. of N-[4-(3-picolyl-2)-butyl]-pyrrolidine prepared as described hereinabove were dissolved in 40 ml. of ethanol. 40 g. of methyl iodide were added to the solution, and the resulting mixture was heated at refluxing temperature for sixteen hours, thus forming the dimethiodide of N-[4-(3-picolyl-2)-butyl]-pyrrolidine which, being insoluble in ethanol, precipitated from the reaction mixture. It was collected by filtration and purified by recrystallization from an ethanol-acetone solvent mixture. Purified N-[4-(3-picolyl-2)-butyl]-pyrrolidine dimethiodide melted at about 205–206° C.

*Analysis.*—Calculated: C, 38.26; H, 5.62. Found: C, 38.76; H, 5.88.

C. HYDROGENATION 19 g. of N-[4-(3-picolyl-2)-butyl]-pyrrolidine dimethiodide were dissolved in a solvent mixture containing 140 ml. ethanol and 20 ml. of 50 percent (w./v.) acetic acid. 1 g. of platinum oxide catalyst was added to this solution, which was then placed in a low pressure hydrogenation apparatus, and was hydrogenated under a pressure of 50 lbs. per square inch of hydrogen gas. The hydrogenation reduced the pyridine ring to a piperidine ring substituted on the ring nitrogen with a methyl group, thus yielding as a reaction product N-methyl-N-[4-(1,3-dimethylpiperidyl-2)-butyl]-pyrrolidinium iodide hydriodide. The product was isolated from the reaction mixture by filtering off the platinum catalyst, and removing the filtrate solvent mixture in vacuo. A crystalline filter cake was obtained which yielded N-methyl-N-[4-(1,3-dimethylpiperidyl-2)-butyl]-pyrrolidinum iodide hydriodide melting at about 196–198° C. after recrystallization from ethanol.

*Analysis.*—Calculated: C, 37.81; H, 6.74. Found: C, 38.32; H, 6.95.

EXAMPLE 2

*Preparation of 1-(1-pyrrolidino)-4-(1,3-dimethylpiperidyl-2)-butane dimethiodide*

A. HYDROGENATION 45 g. of N-[4-(3-picolyl-2)-butyl]-pyrrolidine, as prepared by the procedure of Example 1–A, were dissolved in 150 ml. of 50 percent acetic acid. 1 g. of platinum oxide was added to this solution, which was then placed in a hydrogenation apparatus and hydrogenated under a pressure of 50 lbs./sq. in. of hydrogen gas. The pyridine ring was thereby reduced to a piperidine ring, giving as the reduction product N-[4-(3-pipecolyl-2)-butyl]-pyrrolidine. After the completion of the hydrogenation, the catalyst was removed by filtration and the filtrate was saturated with gaseous hydrogen chloride to form N-[4-(3-pipecolyl-2)-butyl]-pyrrolidine dihydrochloride. The dilute acetic acid solvent was removed by evaporation in vacuo, leaving the dihydrochloride salt as a residue. This salt was dried by adding a mixture of ethanol and benzene thereto and then removing the solvents, including the benzene-water azeotrope, by evaporation in vacuo. The dried N-[4-(3-pipecolyl-2)-butyl]-pyrrolidine dihydrochloride was purified by recrystallization from an ethanol-ether solvent mixture. It melted at about 190–191° C.

B. METHYLATION 9 g. of N-[4-(3-pipecolyl-2)-butyl]-pyrrolidine dihydrochloride, prepared as described above, were converted to the corresponding free base by treatment with concentrated aqueous sodium hydroxide solution followed by extraction of the thus formed free base into ether, dehydration of the ether solution, and evaporation of the ether in vacuo. The free base remaining as a residue was mixed with 16 ml. of concentrated formaldehyde solution and 36 ml. of formic acid. The resulting mixture was refluxed for eight hours, thereby methylating the nitrogen of the piperidine ring of the above compound to give N-[4-(1,3-dimethylpiperidyl-2)-butyl]-pyrrolidine. The reaction mixture was saturated with gaseous hydrogen chloride to form N-[4-(1,3-dimethylpiperidyl-2)-butyl]-pyrrolidine dihydrochloride which was isolated by evaporation of the solvent mixture in vacuo.

C. QUATERNIZATION

The crystalline dihydrochloride salt obtained by the above procedure was extremely hygroscopic and was therefore rapidly converted to the free base by the procedure set forth in Example 2–B above. The free base was dissolved in 50 ml. of ethanol; 40 g. of methyl iodide were added to this solution; and the reaction mixture was heated to refluxing for sixteen hours. The 1-(1-pyrrolidino)-4-(1,3-dimethylpiperidyl-2)-butane dimethiodide thus formed was isolated by evaporating the reaction mixture in vacuo until a crystalline residue formed. The residue was separated by filtration, and was recrystallized from an acetone-ethanol-ethyl acetate solvent mixture. The purified 1-(1-pyrrolidino)-4-(1,3-dimethyl-piperidyl-2)-butane dimethiodide melted at about 278–279° C.

*Analysis.*—Calculated: C, 39.09; H, 6.95. Found: C, 39.31; H, 7.03.

EXAMPLE 3

*Preparation of 4-(1,4-dimethylpiperidyl-2)-1-pyrrolidino butane dimethiodide*

By following the procedure of Example 1–A but employing 2,4-lutidine in place of the 2,3-lutidine, N-[4-(4-picolyl-2)-butyl]-pyrrolidine was prepared. It boiled in the range of 113–116° C. at a pressure of about 0.5 mm. of mercury.

*Analysis.*—Calculated: N, 12.83. Found: N, 12.81. $n_D^{25}=1.512$.

N-[4-(4-picolyl-2)-butyl]-pyrrolidine thus prepared was hydrogenated following the procedure of Example 2–A, and the hydrogenated diamine was treated with hydrogen chloride following the procedure of the same example. N-[4-(4-pipecolyl-2)-butyl]-pyrrolidine dihydrochloride thus formed melted at about 190° C.

*Analysis.*—Calculated: N, 9.42. Found: N, 9.05.

Following the procedure of Example 2–B, N-[4-(4-pipecolyl-2)-butyl]-pyrrolidine was isolated from its dihydrochloride prepared as above; the free base was methylated on the nitrogen of the piperidine ring; and the methylated compound was converted to its dihydrochloride. 4 - (1,4 - dimethylpiperidyl-2)-1-pyrrolidino butane dihydrochloride thus prepared melted at about 264–265° C.

*Analysis.*—Calculated: C, 57.86; H, 10.36. Found: C, 58.10; H, 10.29.

This compound was converted to the corresponding dimethiodide by the procedure of Example 2–C. 4-(1,4-dimethylpiperidyl-2)-1-pyrrolidino butane dimethiodide prepared in this way melted at about 245–246° C.

*Analysis.*—Calculated: C, 39.09; H, 6.95. Found: C, 38.74; H, 7.00.

EXAMPLE 4

*Preparation of N-methyl-N-[4-(1,5-dimethylpiperidyl-2)-butyl]-pyrrolidinium iodide hydriodide*

N-[4-(5-picolyl-2)-butyl]-pyrrolidine was prepared by following the procedure of Example 1–A, except that 2,5-lutidine was used in place of 2,3-lutidine. The compound boiled in the range 116–119° C. at a pressure of about 0.5 mm. of mercury

*Analysis.*—Calculated: N, 12.83. Found: N, 12.65. $n_D^{25}=1.512$.

By sequentially following the procedure of Examples 1–B and 1–C, respectively, this compound was converted to its dimethiodide, which was then hydrogenated to yield N - methyl-N-[4-(1,5-dimethylpiperidyl-2)butyl]-pyrrolidinium iodide hydriodide, melting at about 202–203° C.

*Analysis.*—Calculated: C, 37.81; H, 6.74. Found: C, 38.11; H, 6.82.

EXAMPLE 5

*Preparation of 4-(1,5-dimethylpiperidyl-2)-1-pyrrolidino butane dimethiodide*

N-[4-(5-picolyl-2)-butyl]-pyrrolidine prepared as set forth in Example 4 was hydrogenated to yield N-[4-(5-pipecolyl-2)-butyl]-pyrrolidine by the procedure of Example 2–A. The compound was methylated and the methylated derivative was converted to the corresponding dihydrochloride by the method of Example 2–B. 4-(1,5-dimethylpiperidyl-2)-1-pyrrolidino butane dihydrochloride thus prepared melted at about 256–257° C.

*Analysis.*—Calculated: C, 57.86; H, 10.36. Found: C, 58.37; H, 10.75.

Since this compound was quite hygroscopic, it was converted to the corresponding free base. 4-(1,5-dimethylpiperidyl-2)-1-pyrrolidino butane dimethiodide was prepared from the base by the method of Example 2–C. It melted at about 242–243° C.

*Analysis.*—Calculated: C, 39.09; H, 6.95. Found: C, 39.07; H, 7.05.

EXAMPLE 6

*Preparation of N-methyl-N-[4-(1,6-dimethylpiperidyl-2)-butyl]-pyrrolidinium iodide hydriodide*

N-[4-(6-picolyl-2)-butyl]-pyrrolidine was prepared by following the procedure of Example 1–A but using 2,6-lutidine in place of 2,3-lutidine. N-[4-(6-picolyl-2)-butyl]-pyrrolidine boiled in the range of 120–130° C. at a pressure of about 2 mm. of mercury; $n_D^{25}=1.510$. Then, following the procedure of Example 1–B, this compound was treated with excess methyl iodide to yield N-[4-(6-picolyl-2)-butyl]-pyrrolidine dimethiodide which had the following analysis: Calculated—C, 38.26; H, 5.62. Found—C, 37.97; H, 5.80.

The above dimethiodide was reduced by the procedure of Example 1–C, producing N-methyl-N-[4-(1,6-dimethylpiperidyl-2)-butyl]-pyrrolidinium iodide hydriodide which melted at about 210–212° C.

*Analysis.*—Calculated: C, 37.80; H, 6.74. Found: C, 37.57; H, 7.09.

Using the same procedure as set forth above but employing methyl chloride in place of methyl iodide, N-methyl - N - [4 - (1,6 - dimethylpiperidyl-2)-butyl]-pyrrolidinium chloride hydrochloride was prepared. The compound was hygroscopic. It melted at about 179–180° C. after drying in vacuum at 110° C. for four hours. It analyzed for a hemihydrate with the empirical formula, $C_{16}H_{33}ClN_2 \cdot HCl \cdot \frac{1}{2}H_2O$.

*Analysis.*—Calculated: C, 57.47; H, 10.55. Found: C, 57.45; H, 10.57.

EXAMPLE 7

*Preparation of 1-pyrrolidino-4-(1,6-dimethylpiperidyl-2)-butane dimethiodide*

N-[4-(6-picolyl-2)-butyl]-pyrrolidine, obtained of the procedure of Example 6, was hydrogenated by the process of Example 2–A to yield N-[4-(6-pipecolyl-2)-butyl]-pyrrolidine which boiled in the range 110–115° C. at a pressure of about 1.5 mm. of mercury; $n_D^{25}=1.488$. A solution of the free base was treated with gaseous hydrochloric acid to produce N-[4-(6-pipecolyl-2)-butyl]-pyrrolidine dihydrochloride which melted at about 88–89° C.

*Analysis.*—Calculated: C, 56.55; H, 10.13. Found: C, 56.47; H, 10.21.

N-[4-(6-pipecolyl-2)-butyl]-pyrrolidine produced as above was methylated by the procedure of Example 2–B to yield N-[4-(1,6-dimethylpiperidyl-2)-butyl]-pyrrolidine which had the following refractive index: $n_D^{25}=1.488$. This compound was converted to the corresponding dimethiodide by the method of Example 2–C. 1-pyrrolidino-4-(1,6-dimethylpiperidyl-2)-butane dimethiodide thus prepared melted at about 258–259° C.

*Analysis.*—Calculated: C, 39.09; H, 6.95. Found: C, 39.08; H, 6.99.

EXAMPLE 8

*Preparation of 1-pyrrolidino-4-(1,4,6-trimethylpiperidyl-2)-butane dimethiodide*

Following the procedure of Example 1–A, pyrrolidinopropyl chloride and 2,4,6-collidine were reacted together to yield N-[4-(4,6-dimethylpyridyl-2)-butyl]-pyrrolidine which boiled in the range 115–121° C. at a pressure of about 0.5 mm. of mercury.

*Analysis.*—Calculated: N, 12.06. Found: N, 1187. $n_D^{25}=1.510$.

N-[4-(4,6-dimethylpyridyl-2)-butyl] - pyrrolidine was hydrogenated following the procedure of Example 2–A but using about 12 g. of Raney nickel as a catalyst in place of platinum oxide, and heating the hydrogenation flask to about 150° C. during the reaction. When the hydrogenation had been completed, the catalyst was removed by filtration, and the reaction mixture was saturated with gaseous hydrogen chloride to form N-[4-(4,6-dimethylpiperidyl-2)-butyl]-pyrrolidine dihydrochloride. The solvent was removed in vacuo, leaving as a residue the crystalline dihydrochloride salt which was recrystallized from an ethanol-acetone-diethyl ether solvent mixture. N-[4-(4,6-dimethylpiperidyl-2)-butyl]-pyrrolidine dihydrochloride melted at about 250–251° C.

*Analysis.*—Calculated: C, 57.86; H, 10.36. Found: C, 57.97; H, 10.40.

Following the procedure of Example 2–B, N-[4-(4,6-dimethylpiperidyl-2)-butyl] - pyrrolidine dihydrochloride was converted to the free base, which was thereafter methylated on the nitrogen atom of the piperidine ring. The reaction mixture was saturated with gaseous hydrogen chloride to give N-[4-(1,4,6-trimethylpiperidyl-2)-butyl]-pyrrolidine dihydrochloride which was obtained as a crystalline residue after evaporation of the solvents in vacuo. The residue was recrystallized from an ethanol-acetone-ether solvent mixture to yield N-[4-(1,4,6-trimethylpiperidyl-2)-butyl]-pyrrolidine dihydrochloride melting at about 245–246° C.

*Analysis.*—Calculated: C, 59.06; H, 10.53. Found: C, 59.23; H, 10.72.

Following the procedure of Example 2–C, N-[4-(1,4,6-trimethylpiperidyl-2)-butyl] - pyrrolidine dihydrochloride was converted to the free base which was reacted with methyl iodide in ethanol solution to yield, after recrystallization from 95 percent ethanol, 1-pyrrolidino-4-(1,4,6-trimethylpiperidyl-2)-butane dimethiodide monohydrate melting at about 219–220° C.

*Analysis.*—Calculated: C, 38.98; H, 7.22. Found: C, 39.13; H, 7.02.

EXAMPLE 9

*Preparation of 1-piperidino-4-(1,6-dimethylpiperidyl-2)-butane dimethiodide*

1 mol of sodamide was prepared as a suspension in 2 l. of liquid ammonia. 2 mols of 2,6-lutidine were added dropwise to this suspension. The resulting mixture was stirred for one-half hour, and was then cooled to about —80° C. for one hour. 1 mol of trimethylene chlorobromide was added to the reaction mixture, followed by 2 mols of piperidine. After the addition had been completed, the reaction mixture was stirred for about sixteen hours followed by a four-hour period of heating to refluxing temperature. It was then diluted with about 2 l. of diethyl ether. The N-[4-(6-picolyl-2)-butyl]-piperidine formed in the reaction dissolved in the ether along with various organic impurities. The ether layer was washed with a mixture of about 400 ml. of a saturated sodium chloride solution. The organic phase was separated, was dried, and the ether was removed by distillation in vacuo. The residue, comprising N-[4-(6-picolyl-2)-butyl]-piperidine, was subjected to fractional distillation, the fraction boiling in the range 110–122° C. at a pressure of about 0.4 mm. of mercury being collected.

*Analysis.*—Calculated: N, 12.06. Found: N, 11.82. $n_D^{25} = 1.517$.

N-[4-(6-picolyl-2)-butyl]-piperidine thus prepared was hydrogenated by the method of Example 2–A to give N - [4 - (6 - pipecolyl - 2) - butyl] - piperidine which was methylated on the nitrogen atom of the piperidine ring by the method of Example 2–B to yield 1-piperidino-4-(1,6-dimethylpiperidyl-2)-butane. This compound was quaternized with methyl iodide in ethanol solution by the procedure of Example 2–C to yield 1-piperidino-4-(1,6-dimethylpiperidyl-2)-butane dimethiodide which after crystallization from an ethanol-acetone-ether solvent mixture melted at about 271–272° C.

*Analysis.*—Calculated: C, 40.31; H, 7.14. Found: C, 40.39; H, 7.41.

EXAMPLE 10

*Preparation of N-methyl-N-[3-(1,6-dimethylpiperidyl-2)-propyl]-pyrrolidinium iodide hydriodide*

The procedure of Example 1–A was followed except that 2,6-lutidine was employed in place of 2,3-lutidine and N-(2-chloroethyl)-pyrrolidine was employed in place of N-(3-chloropropyl)-pyrrolidine. N-[3-(6-picolyl-2)-propyl]-pyrrolidine thus prepared distilled in the range 85–95° C. at a pressure of about 0.05 mm. of mercury.

*Analysis.*—Calculated: C, 76.42; H, 9.87. Found: C, 76.78; H, 9.82. $n_D^{25} = 1.514$.

Following the procedure of Example 1–B, this compound was reacted with excess methyl iodide to yield N-[3-(6 - picolyl - 2) - propyl] - pyrrolidine dimethiodide which melted at about 224–225° C.

*Analysis.*—Calculated: C, 36.90; H, 5.37. Found: C, 37.40; H, 5.68.

The dimethiodide thus prepared was hydrogenated by the procedure of Example 1–C to yield N-methyl-N-[3-(1,6-dimethylpiperidyl-2)-propyl] - pyrrolidinium iodide hydriodide which melted at about 205–206° C. The compound crystallized as a monohydrate from aqueous ethanol.

*Analysis.*—Calculated: C, 35.16; H, 6.29. Found: C, 35.36; H, 6.38.

EXAMPLE 11

*Preparation of 1-pyrrolidino-3-(1,6-dimethylpiperidyl-2)-propane dimethiodide*

N-[3-(6-picolyl-2)-propyl]-pyrrolidine, prepared by the procedure of Example 10, was reduced by the method of Example 2–A to yield N-[3-(6-pipecolyl-2)-propyl]-pyrrolidine which was isolated as the dihydrochloride salt, melting at about 245–246° C.

*Analysis.*—Calculated: C, 55.11; H, 9.96. Found: C, 55.24; H, 10.12.

The said dihydrochloride salt was converted to the corresponding free base by the method of Example 2–B. This compound was methylated to yield 1-pyrrolidino-3-(1,6-dimethylpiperidyl-2)-propane, which was isolated as the corresponding dihydrochloride salt melting at about 279–280° C.

*Analysis.*—Calculated: C, 56.55; H, 10.17. Found: C, 56.30; H, 10.15.

The dihydrochloride salt of 1-pyrrolidino-3-(1,6-dimethylpiperidyl-2)-propane was converted by the method of Example 2–C to the free base, which base was treated with excess methyl iodide to produce 1-pyrrolidino-3-(1,6 - dimethylpiperidyl - 2) - propane dimethiodide melting at about 199–200° C.

*Analysis.*—Calculated: C, 37.81; H, 6.74. Found: C, 37.56; H, 6.88.

EXAMPLE 12

*Preparation of 1-pyrrolidino-4-(1-methylpiperidyl-2)-pentane dimethiodide*

Following the procedure of Example 1–A, 2-ethylpyridine and N-(3-chloropropyl)-pyrrolidine were condensed by means of sodamide in liquid ammonia solution. The condensation took place on the α-carbon atom of the ethyl side chain of the pyridine ring to yield 1-pyrrolidino-4-(pyridyl-2)-pentane which boiled in the range 105–115° C. at the pressure of about 0.5 mm. of mercury.

*Analysis.*—Calculated: N, 12.83. Found: N, 12.71. $n_D^{25} = 1.508$.

Following the procedure of Example 2–A, the above-described substituted pentane was hydrogenated to produce 1-pyrrolidino-4-(piperidyl-2)-pentane, which was isolated as its dihydrochloride salt melting at about 198–199° C.

*Analysis.*—Calculated: C, 56.55; H, 10.17. Found: C, 55.74; H, 10.05.

Following the process of Example 2–B, 1-pyrrolidino- 4-(piperidyl-2)-pentane base was liberated from its dihydrochloride salt and was then methylated on the nitrogen atom of the piperidine ring to produce 1-pyrrolidino-4-(1-methylpiperidyl-2)-pentane, which was also isolated as the dihydrochloride salt.

*Analysis.*—Calculated: C, 57.86; H, 10.36. Found: C, 57.62; H, 10.48.

Following the procedure of Example 2–C, 1-pyrrolidino-4-(1-methylpiperidyl-2)-pentane dihydrochloride was converted to the corresponding free base which was treated with excess methyl iodide to produce 1-pyrrolidino-4-(1-methylpiperidyl-2)-pentane dimethiodide, melting at about 250–251° C.

*Analysis.*—Calculated: C, 39.09; H, 6.95. Found: C, 38.96; H, 7.05.

EXAMPLE 13

*Preparation of 1-pyrrolidino-4-(1-methylpiperidyl-2)-3-methylbutane dimethiodide*

Following the procedure of Example 1–A, α-picoline and N-(3-chlorobutyl)-pyrrolidine were condensed to yield N-[4-pyridyl-2)-3-methylbutyl]-pyrrolidine which boiled in the range 90–100° C. at a pressure of about 0.05 mm. of mercury.

*Analysis.*—Calculated: N, 12.83. Found: N, 12.91. $n_D^{25} = 1.510$.

The process of Example 2–A was employed to hydrogenate N-[4-(pyridyl-2)-3-methylbutyl]-pyrrolidine to form the corresponding piperidine derivative. This compound was isolated and purified as the dihydrochloride salt. N-[4-(piperidyl-2)-3-methylbutyl]-pyrrolidine dihydrochloride thus prepared melted at about 194–196° C.

*Analysis.*—Calculated: C, 56.55; H, 10.17. Found: C, 56.45; H, 10.35.

Using the method of Example 2–B, the said dihydrochloride salt was converted to the corresponding free base which was methylated on the nitrogen atom of the piperidine ring to form 1-pyrrolidino-4-(1-methylpiperidyl-2)-3-methylbutane. The compound was isolated as the dihydrochloride salt which melted at about 254–255° C.

*Analysis.*—Calculated. C, 57.86; H, 10.36. Found: C, 58.02; H, 10.48.

Following the procedure of Example 2–C, 1-pyrrolidino - 4 - (1 - methylpiperidyl-2)-3-methylbutane dihydrochloride was converted to the corresponding free base which base was treated with excess methyl iodide to produce 1-pyrrolidino-4-(1-methylpiperidyl-2)-3-methylbutane dimethiodide, which did not melt when heated to about 250° C.

*Analysis.*—Calculated: C, 39.09; H, 6.95. Found: C, 39.32; H, 7.14.

EXAMPLE 14

*Preparation of N-methyl-N -[4-(1- methylpiperidyl-2)-pentyl]-pyrrolidinium iodide hydriodide*

1-pyrrolidino-4-(pyridyl-2)-pentane, as provided by Example 12, was converted to 1-pyrrolidino-4-(pyridyl-2)-pentane dimethiodide by the procedure of Example 1–B. This compound was hygroscopic. It was hydrogenated without further purification by the procedure of Example 1–C to yield N-methyl-N[4-(1-methylpiperidlyl-2)-pentyl]-pyrrolidinium iodide hydriodide which melted at about 158–160° C.

*Analysis.*—Calculated: C, 37.81; H, 6.74. Found: C, 38.19; H, 6.73.

EXAMPLE 15

*Preparation of N-methyl-N-[3-(1-methylpiperidyl-2)-propyl]-pyrrolidinium iodide hydriodide*

Following the procedure of Example 1–A, N-(2-chloroethyl)-pyrrolidine and α-picoline were condensed to yield N-[3-(picolyl-2)-propyl]-pyrrolidine, which was then treated with excess methyl iodide by the method of Example 1–B, to produce N-[3-picolyl-2)-propyl]-pyrrolidine dimethiodide.

*Analysis.*—Calculated: C, 35.46; H, 5.10. Found: C, 35.27; H, 5.35.

Following the procedure of Example 1–C, this dimethiodide was hydrogenated to produce N-methyl-N-[3-(1-methylpiperidyl - 2) - propyl] - pyrrolidinium iodide hydriodide, having a decomposition point of about 130–132° C.

*Analysis.*—Calculated: C, 35.01; H, 6.30. Found: C, 34.86; H, 6.78.

EXAMPLE 16

*Preparation of 1-pyrrolidino-3-(1-methylpiperidyl-2)-propyl dimethiodide*

1-pyrrolidino-4-(pyridyl-2)-propane, prepared by the procedure of Example 15, was hydrogenated by the method of Example 2–A to yield 1-pyrrolidino-4-(piperidyl-2)-propane which was isolated as the dihydrochloride salt melting at about 195–196° C.

*Analysis.*—Calculated: C, 53.52; H, 9.73. Found: C, 53.54; H, 9.95.

The above-described dihydrochloride salt was converted to the free base which was methylated by the method of Example 2–B, to yield 1-pyrrolidino-3-(1-methylpiperidyl-2)-propane. The dihydrochloride salt of 1-pyrrolidino-3-(1-methylpiperidyl-2)-propane thus prepared melted at about 225–226° C.

*Analysis.*—Calculated: C, 55.11; H, 9.96. Found: C, 55.17; H, 10.01.

Following the procedure of Example 2–C, 1-pyrrolidino-3 - (1 - methylpiperidyl - 2)-propane dihydrochloride was converted to the corresponding free base which was treated with excess methyl iodide to yield 1-pyrrolidino-3-(1-methylpiperidyl-2)-propane dimethiodide melting at about 294–295° C.

*Analysis.*—Calculated: C, 36.45; H, 6.53. Found: C, 36.63; H, 6.67.

EXAMPLE 17

*Preparation of N-methyl-N,N-diethyl-N-[3-(1-methylpiperidyl-2)-propyl]-ammonium iodide hydriodide*

Following the procedure of Example 1–A, α-picoline was condensed with N-(2-chloroethyl)-diethylamine to yield N-[3-(pyridyl-2)-propyl]-diethylamine, which was treated with excess methyl iodide by the method of Example 1–B to give N-[3-pyridyl-2)-propyl]-diethylamine dimethiodide melting at about 149–151° C.

*Analysis.*—Calculated: C, 35.31; H, 5.50. Found: C, 35.03; H, 5.77.

Following the procedure of Example 1–C, the said dimethiodide was hydrogenated to yield N-methyl-N,N-diethyl-N-3-(1-methylpiperidyl-2)-propyl ammonium iodide hydriodide, melting at about 191–192° C.

EXAMPLE 18

*Preparation of 1-diethylamino-3-(1-methylpiperidyl-2)-propane dimethiodide*

1-diethylamino-3-(pyridyl-2)-propane, as provided by Example 17, was catalytically hydrogenated by the method of Example 2–A to produce 1-diethylamino-3-(piperidyl-2)-propane which was isolated and purified as the dihydrochloride salt melting at about 229–230° C.

*Analysis.*—Calculated: C, 53.13; H, 10.40. Found: C, 52.93; H, 10.26.

1-diethylamino-3-(piperidyl - 2) - propane dihydrochloride was converted to the free base which was methylated by the procedure of Example 2–B, to give 1-diethylamino-3-(1-methylpiperidyl-2)-propane. The compound was isolated and purified as the dihydrochloride salt.

*Analysis.*—Calculated: C, 54.72; H, 10.60. Found: C, 54.47; H, 10.45.

By using the method of Example 2–C, 1-diethylamino-3-(1-methylpiperidyl-2)-propane dihydrochloride was converted to the free base, which was treated with excess methyl iodide to yield 1-diethylamino-3-(1-methylpiperidyl-2)-propane dimethiodide melting at about 194–195° C.

Analysis.—Calculated: C, 36.30; H, 6.91. Found: C, 36.30; H, 5.93.

EXAMPLE 19

*Preparation of 1-pyrrolidino-4-(1-methylpiperidyl-2)-butane dimethiodide*

7 g. of sodium were added to 1100 g. of ethyl cyanoacetate. The resulting mixture was heated to about 100° C., and 210 g. of α-vinylpyridine were added dropwise while maintaining the temperature of the reaction mixture in the range of about 100–110° C., both during the addition and for five hours thereafter. The mixture was stirred overnight at ambient temperature to insure more nearly complete addition of the sodium salt of ethyl cyanoacetate to the double bond of the α-vinyl group of the α-vinylpyridine, thus producing the sodium salt of ethyl 5-(pyridyl-2)-2-cyanocaproate. The reaction mixture was poured into about 3 l. of a mixture containing equal volumes of 3 N hydrochloric acid and ice, thereby converting the above-formed sodium salt to ethyl 5-(pyridyl-2)-2-cyanocaproate hydrochloride. The acidic aqueous layer was extracted with 1 l. of ether, and the ether layer was separated and discarded. The acidic aqueous layer was made basic by the addition of solid potassium carbonate, thus forming the free base of ethyl 5-(pyridyl-2)-2-cyanocaproate which was insoluble in the now basic aqueous layer. The free base was taken up into ether by extracting the basic aqueous layer twice with 3 l. portions of ether. The ether fractions were combined and dried, and the ether was removed by evaporation in vacuo. The resulting residue comprising ethyl 5-(pyridyl-2)-2-cyanocaproate was distilled and the fraction boiling in the range 148–151° C. at a pressure of about 0.8 mm. of mercury was collected; $n_D^{25}=1.497$.

The ethyl 5-(pyridyl-2)-2-cyanocaproate was saponified by refluxing overnight with an equivalent amount of sodium hydroxide in the form of a 10 percent solution in a 50–50 ethanol-water solvent mixture to produce the sodium salt of 5-(pyridyl-2)-2-cyanocaproic acid. The saponification mixture was neutralized with 12 N hydrochloric acid, thus converting the above sodium salt to the free acid, and the neutralized mixture was evaporated to dryness in vacuo, leaving 5-(pyridyl-2)-2-cyanocaproic acid as a residue. The residue was heated to about 120° C. under high vacuum (1 mm. of mercury) at which temperature decarboxylation of the acid began to occur. As the decarboxylation process neared completion, the 4-(pyridyl-2)-butyronitrile formed began to distill. The fraction boiling in the temperature range of about 102–106° C. at a pressure of about 0.6 mm. of mercury was collected. The yield of 4-(pyridyl-2)-butyronitrile was 61 g.

Analysis.—Calculated: N, 19.16. Found: N, 19.27. $n_D^{25}=1.510$.

A mixture of 61 g. of 4-(pyridyl-2)-butyronitrile, 200 ml. of pyrrolidine and 18 g. of a heavy suspension of Raney nickel catalyst in ethanol was placed in a high pressure hydrogenation apparatus and was subjected to a pressure of 2000 atmospheres of hydrogen and to a temperature ranging from 75–100° C. The product of this reaction was N-[4-(pyridyl-2)-butyl]-pyrrolidine. After the reaction had been completed, the reaction vessel was cooled; the catalyst was separated from the reaction mixture by filtration; and the filtrate was distilled. Fractions boiling in the range of 95–115° C. at a pressure of about 0.1 mm. of mercury were collected, combined and redistilled through a fractionating column. The fractions combined for redistillation contained chiefly N-[4-(pyridyl-2)-butyl]-pyrrolidine and as a contaminant, 4-(pyridyl-2)-butylamine. Fractions containing the latter compound boiled below 75° C. at the pressure of about 1.5 mm. of mercury and were discarded. Fractions containing N-[4-(pyridyl-2)-butyl]-pyrrolidine boiled at about 85° C. at a pressure of about 1 mm. of mercury; $n_D^{25}=1.513$.

Analysis.—Calculated: N, 13.71. Found: N, 13.73.

Following the procedure of Example 2–A, N-[4-(pyridyl-2)-butyl]-pyrrolidine was reduced to N-[4-(piperidyl-2)-butyl]-pyrrolidine which distilled at about 115° C. at a pressure of about 6 mm. of mercury.

Analysis.—Calculated: N, 13.32. Found: N, 13.42. $n_D^{25}=1.484$.

Following the method of Example 2–B, N-4-[4-(piperidyl-2)-butyl]-pyrrolidine was methylated to produce 1-pyrrolidino-4-(1-methylpiperidyl-2)-butane which was purified by distillation. It boiled at about 118° C. at a pressure of about 1 mm. of mercury.

Analysis.—Calculated: C, 74.95; H, 12.58; N, 12.49. Found: C, 74.78; H, 12.76; N, 12.50. $n_D^{25}=1.481-2$.

Following the procedure of Example 2–C, 1-pyrrolidino-4-(1-methylpiperidyl-2)-butane was refluxed with excess methyliodide in methanol solution to yield 1-pyrrolidino-4-(1-methyl piperidyl-2)-butane dimethiodide which, after recrystallization from an ethanol-ethyl acetate solvent mixture, melted above 250° C.

Analysis.—Calculated: C, 37.81; H, 6.74. Found: C, 37.58; H, 6.73.

In the same fashion, but employing ethyl iodide in place of methyl iodide, 1-pyrrolidino-4-(1-methylpiperidyl-2)-butane diethiodide was prepared. It melted at about 278–279° C.

Analysis.—Calculated: C, 40.31; H, 7.14. Found: C, 40.34; H, 7.26.

EXAMPLE 20

*Preparation of 1-pyrrolidino-4-(1-methylpiperidyl-2)-butane dimethchloride and dimethbromide*

1-pyrrolidino-4-(1-methylpiperidyl-2)-butane, as prepared in Example 19, was heated in a pressure vessel to about 95° C. for about sixteen hours with an excess of methyl chloride dissolved in ethanol. Addition of ethyl acetate to the cooled reaction mixture caused immediate crystallization of 1-pyrrolidino-4-(1-methylpiperidyl-2)-butane dimethchloride. The crystals were collected by filtration, were triturated with acetone, and were recrystallized from an ethanol-ethyl acetate solvent mixture to yield purified 1-pyrrolidino-4-(1-methylpiperidyl-2)-butane dimethchloride melting at about 298–299° C.

Analysis.—Calculated: C, 59.06; H, 10.53. Found: C, 59.29; H, 10.70.

In analogous fashion, but employing methyl bromide in place of methyl chloride, 1-pyrrolidino-4-(1-methylpiperidyl-2)-butane dimethbromide was prepared. It melted with decomposition at about 299–300° C.

Analysis.—Calculated: C, 46.38; H, 8.27. Found: C, 46.34; H, 8.39.

EXAMPLE 21

*Preparation of 1-diethylamino-4-(1-methylpiperidyl-2)-butane dimethiodide*

Following the procedure of Example 1–A, N-(3-chloropropyl)-diethylamine and α-picoline were condensed in the presence of sodamide to produce N-[4-(pyridyl-2)-butyl]-diethylamine which had a refractive index as follows: $n_D^{25}=1.490$. The compound was reduced by the method of Example 2–A to yield N-[4-(piperidyl-2)-butyl]-diethylamine which was purified by distillation. It boiled at a temperature of about 95–97° C. at a pressure of about 0.05 mm. of mercury.

Analysis.—Calculated: C, 73.52; H, 13.29. Found: C, 73.29; H, 13.14.

N-[4-(piperidyl-2)-butyl]-diethylamine was methylated by the process of Example 2–B to form N-[4-(1-methylpiperidyl-2)-butyl]-diethylamine which, after purification by distillation in vacuo, had a refractive index as follows: $n_D^{25}=1.464$. The compound was treated with excess methyl iodide by the procedure of Example 2–C to give 1-diethylamino-4-(1-methylpiperidyl-2)-butane dimethiodide which was purified by recrystallization from an ethanol-ethyl acetate solvent mixture. It did not melt even when heated to 260° C.

*Analysis.*—Calculated: C, 37.66; H, 7.11. Found: C, 37.75; H, 7.23.

EXAMPLE 22

*Preparation of 1-piperidino-4-(1-methylpiperidyl-2)-butane dimethiodide*

Following the procedure of Example 19, 4-(pyridyl-2)-butyronitrile was condensed with piperidine under hydrogenating conditions to yield N-[4-(pyridyl-2)-butyl]-piperidine boiling in the range of 110–115° C. at a pressure of about 0.1 mm. of mercury; $n_D^{25}=1.514$. The compound was further hydrogenated by the method of Example 2–A to produce N-[4-(piperidyl-2)-butyl]-piperidine which boiled in the range 95–105° C. at a pressure of about 0.1 mm. of mercury; $n_D^{25}=1.493$. N-[4-(piperidyl-2)-butyl]-piperidine was methylated by the procedure of Example 2–B to yield 1-piperidino-4-(1-methylpiperidyl-2)-butane. The compound was converted to the corresponding dimethiodide by the method of Example 2–C. 1-piperidino-4-(1-methylpiperidyl-2)-butane dimethiodide thus prepared melted at about 292–293° C.

*Analysis.*—Calculated: C, 39.09; H, 6.95. Found: C, 38.90; H, 7.08.

EXAMPLE 23

*Preparation of 1-pyrrolidino-3-(1-ethylpiperidyl-2)-propane dimethiodide*

8 g. of the free base of 1-pyrrolidino-3-(piperidyl-2)-propane as provided by Example 15 were refluxed with about 30 g. of acetic anhydride for about fifteen minutes, thus forming 1-pyrrolidino-3-(1-acetylpiperidyl-2)-propane. The excess acetic anhydride was removed by evaporation in vacuo and the residue, comprising 1-pyrrolidino-3-(1-acetylpiperidyl-2)-propane and its acetate salts, was poured into an excess of 25 percent (w./v.) aqueous sodium hydroxide to form the corresponding free base. The free base was extracted with diethyl ether; the ether extract was dried; and the ether was removed by evaporation in vacuo, leaving as a residue 1-pyrrolidino-3-(1-acetylpiperidyl-2)-propane. The residue was fractionally distilled under reduced pressure and a fraction weighing 8 g. and boiling in the range 125–130° C. at a pressure of about 0.1 mm. of mercury was collected. 1-pyrrolidino-3-(1-acetylpiperidyl-2)-propane thus obtained had the following refractive index: $n_D^{25}=1.500$.

A mixture containing 2 g. of lithium aluminum hydride and 150 ml. of anhydrous ether was prepared. 8 g. of 1-pyrrolidino-3-(1-acetylpiperidyl-2)-propane in 100 ml. of anhydrous ether were added dropwise thereto, with stirring. After the addition had been completed the reaction mixture was stirred at room temperature for about sixteen hours, and was held at refluxing temperature for about two more hours. This process reduced the N-acetyl group to an N-ethyl group. The reaction mixture was decomposed by adding to its successively in dropwise fashion, 3.5 ml. of water, 2.5 ml. of 20 percent (w./v.) sodium hydroxide and 12.5 ml. of water. The solid inorganic salts which formed were removed by filtration, leaving 1-pyrrolidino-3-(1-ethylpiperidyl-2)-propane in the ethereal filtrate. The filter cake was washed with ether, and the combined filtrate and washings were washed once with about 100 ml. of a saturated aqueous sodium chloride solution and were dried. The ether solvent was evaporated in vacuo leaving 1-pyrrolidino-3-(1-ethylpiperidyl-2)-propane as a residue. The residue was fractionally distilled, yielding 5 g. of 1-pyrrolidino-3-(1-ethylpiperidyl-2)-propane boiling in the range 102–110° C. at a pressure of about 0.1 mm. of mercury; $n_D^{25}=1.484$. The distillate was treated with excess methyl iodide by the method of Example 2–C to yield 1-pyrrolidino-3-(1-ethylpiperidyl-2)-propane dimethiodide melting with decomposition at about 202–204° C.

*Analysis.*—Calculated: C, 37.81; H, 6.74. Found: C, 37.55; H, 6.77.

EXAMPLE 24

*Preparation of 1-diethylamino-3-(1-ethylpiperidyl-2)-propane dimethiodide*

1-diethylamino-3-(piperidyl-2)-propane, as prepared in Example 18, was ethylated using the procedure of Example 23, to produce 1-diethylamino-3-(1-ethylpiperidyl-2)-propane, which boiled in the range 90–100° C. at a pressure of about 0.5 mm. of mercury; $n_D^{25}=1.468$. The compound was converted to the corresponding dimethiodide by the procedure of Example 2–C to yield 1-diethylamino-3-(1-ethylpiperidyl-2)-propane dimethiodide.

*Analysis.*—Calculated: C, 36.43; H, 7.21. Found: C, 36.44; H, 7.01.

I claim:

1. A compound represented by the formula

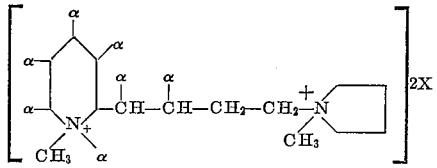

in which from 5 to 7 of the groups represented by α are hydrogen, and the rest are methyl, and X is a halogen of the group consisting of chlorine, bromine and iodine.

2. 1-pyrrolidino - 4 - (1-methylpiperidyl-2)-butane dimethiodide.

3. 1-pyrrolidino-4-(1,6-dimethylpiperidyl-2)-butane dimethiodide.

4. N-methyl - [4 - (1,6 - dimethylpiperidyl-2) - butyl]-pyrrolidine iodide hydriodide.

5. 1-pyrrolidino-4-(1,5-dimethylpiperidyl-2)-butane dimethiodide.

6. N - methyl - N - [4 - (1-methylpiperidyl-2)-butyl]-pyrrolidine iodide hydriodide

References Cited in the file of this patent

UNITED STATES PATENTS 2,684,965   Weston _____ July 27, 1952

FOREIGN PATENTS 751,825   Great Britain _____ July 4, 1956

OTHER REFERENCES

Phillips, JACS, volume 76, pp. 2211–13 (1954).